United States Patent
Sprung

(10) Patent No.: US 8,161,909 B2
(45) Date of Patent: Apr. 24, 2012

(54) MAGNETIC CLEANING DEVICE AND METHODS OF MAKING AND USING SUCH A CLEANING DEVICE

(76) Inventor: Julian Sprung, Miami Beach, FL (US)

( * ) Notice: Subject to any disclaimer, the term of this patent is extended or adjusted under 35 U.S.C. 154(b) by 181 days.

(21) Appl. No.: 12/372,506

(22) Filed: Feb. 17, 2009

(65) Prior Publication Data

US 2009/0211533 A1    Aug. 27, 2009

Related U.S. Application Data

(60) Provisional application No. 61/064,080, filed on Feb. 14, 2008, provisional application No. 61/129,277, filed on Jun. 16, 2008.

(51) Int. Cl.
*A01K 63/00* (2006.01)
*A47L 1/09* (2006.01)
(52) U.S. Cl. ...................... 119/264; 15/220.2
(58) Field of Classification Search ............ 119/264; 15/220.2, 250.28
See application file for complete search history.

(56) References Cited

U.S. PATENT DOCUMENTS

| | | | |
|---|---|---|---|
| 3,208,090 A | 9/1965 | Roesel, Jr. | |
| 3,922,747 A * | 12/1975 | Kaftan | 15/220.2 |
| 5,515,570 A * | 5/1996 | Muscroft | 15/220.2 |
| 5,778,824 A | 7/1998 | Musgrave et al. | |
| 5,988,109 A | 11/1999 | Rofen | |
| 6,206,978 B1 * | 3/2001 | Tsui | 134/8 |
| 6,348,104 B1 | 2/2002 | Bakker | |
| 6,422,746 B1 | 7/2002 | Weiss et al. | |
| 6,634,052 B2 | 10/2003 | Hanson | |
| 6,865,771 B2 | 3/2005 | Hanson | |
| 7,229,210 B2 * | 6/2007 | Yim | 374/208 |
| 7,313,841 B2 * | 1/2008 | Huang | 15/220.2 |
| 7,506,612 B2 * | 3/2009 | Enoch et al. | 119/264 |
| 7,699,277 B2 * | 4/2010 | Bagnall | 248/206.5 |
| 7,784,428 B2 * | 8/2010 | Deng | 119/264 |
| 2006/0090278 A1 * | 5/2006 | Hang | 15/220.2 |
| 2006/0174840 A1 * | 8/2006 | Rafailovich | 119/264 |
| 2007/0107665 A1 | 5/2007 | Enoch, III et al. | |
| 2010/0024739 A1 * | 2/2010 | Bakker | 119/264 |

* cited by examiner

*Primary Examiner* — Kristen C Hayes
(74) *Attorney, Agent, or Firm* — Venable LLP

(57) ABSTRACT

An aquarium wall cleaning device and a method for manufacturing the same are provided. The device may include a first flexible member including a main body formed from a flexible buoyant material, a first magnetic or magnetically attractable element disposed within the main body of the first flexible member, and a first layer attached to the main body of first flexible member and having an abrasive surface. The first flexible member may be substantially neutrally buoyant or negatively buoyant in water. The device may also include a second member including a main body, a second magnetic or magnetically attractable element disposed within the main body of the second member, and a second layer having a soft surface attached to the main body of the second member. At least one of the first and second magnetic or magnetically attractable elements may include a magnetic material. The other of the first and second elements may be magnetically attracted to the magnetic material. When the first flexible member and the second member are placed on opposite sides of an aquarium wall and the first and second magnetic or magnetically attractable elements are attracted to one another, the abrasive surface and the soft surface contact respective inner and outer sides of the wall to allow cleaning of at least one side of the wall.

20 Claims, 19 Drawing Sheets

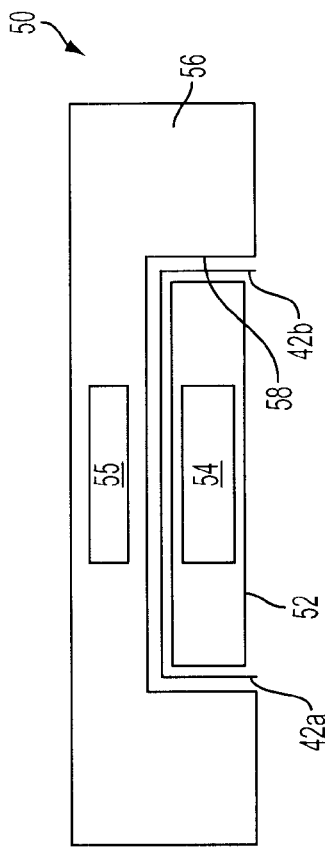
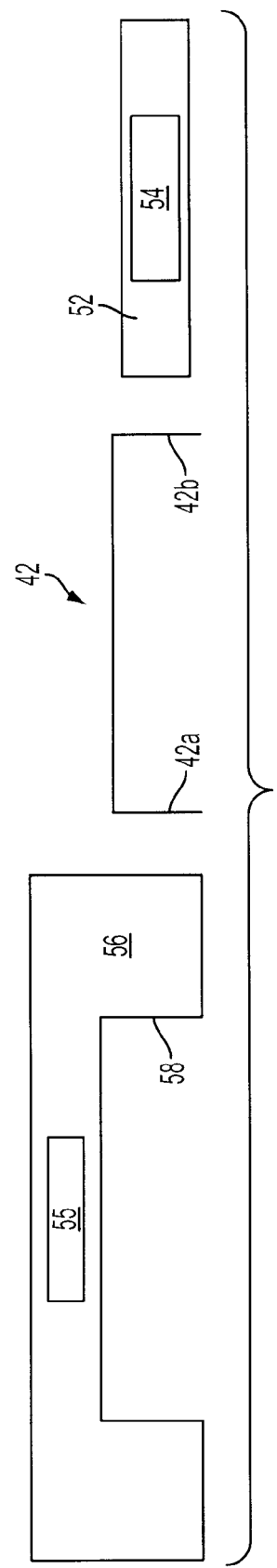
FIG. 17
FIG. 18

MAGNETIC CLEANING DEVICE AND METHODS OF MAKING AND USING SUCH A CLEANING DEVICE

CROSS-REFERENCE TO RELATED APPLICATIONS

This application claims the priority benefit under 35 U.S.C. §119(e) of U.S. provisional patent application No. 61/064,080, filed Feb. 14, 2008, the entirety of which is hereby incorporated by reference. This application also claims the priority benefit under 35 U.S.C. §119(e) of U.S. provisional patent application No. 61/129,277, filed Jun. 16, 2008, the entirety of which is hereby incorporated by reference. Each and every U.S. patent and patent application mentioned herein is expressly incorporated by reference in its entirety.

BACKGROUND

Field of Invention

The invention is related to cleaning devices for windows or aquarium walls and a method for manufacturing the same. More particularly, the invention is related to a magnetic cleaning device having a first member and a second member, the first member having an element magnetically attracted to an element associated with the second member. One of the first and second members may include a cleaning surface and/or may be substantially neutrally or negatively buoyant and/or may be flexible.

Building and maintaining successful and beautiful aquariums is a popular hobby for many people. Aquariums are generally designed to host aquatic life in a natural and attractive contained environment. Maintaining a clean and aesthetically pleasing aquarium requires regular care and cleaning because the walls of aquariums can accumulate algae, including hard coralline algae. Traditionally, this task often required the owner to reach through the top of the tank with cleaning devices or, for large scale cleaning, the tank was required to be emptied.

SUMMARY

The invention relates to a device used, for example, for removing algae or other material from aquarium windows. The device may be used in all types of aquariums such as, for example, freshwater and saltwater, including small or large aquariums, aquariums with curved windows, and fishbowls.

The invention also relates to a method of manufacturing said device that may be simple and low-cost. The composition of the device is also unique for its particular application.

Known cleaning products can be bulky and often cannot be used effectively in very small aquariums. The device and method may allow for the manufacture of an extremely small and/or thin window cleaner, which may be useful and marketable for small aquariums and fishbowls and which can slip between the aquarium decorations and windows easily. The device may provide a flexible window cleaner that can conform to the shape of curved windows. The device may have several potential commercial applications such as, e.g., a product to clean transparent aquarium walls and/or a window-cleaning device used to clean windows on buildings. The device may be used, for example, for the specific purpose of cleaning curved windows, because it may be made from a flexible material. The device could, for example, be sold in the aquarium industry.

The device preferably has no air pocket, so it can be made extremely thin and/or extremely small, allowing it to reach areas that cannot be reached by other magnetic cleaners. The device may be constructed from soft, flexible parts, which may offer the following advantages: the inner piece is flexible so it can bend to clean curved surfaces; and the outer piece may feel soft in the hand of a user.

In an embodiment of the invention, an aquarium wall cleaning device and a method for manufacturing the same are provided. The device may include a first flexible member including a main body formed from a flexible buoyant material, a first magnetic or magnetically attractable element disposed within the main body of the first flexible member, and a first layer attached to the main body of first flexible member and having an abrasive surface. The first flexible member may be substantially neutrally buoyant or negatively buoyant in water. The device may also include a second member including a main body, a second magnetic or magnetically attractable element disposed within the main body of the second member, and a second layer having a soft surface attached to the main body of the second member. At least one of the first and second magnetic or magnetically attractable elements may include a magnetic material. The other of the first and second elements may be magnetically attracted to the magnetic material. When the first flexible member and the second member are placed on opposite sides of an aquarium wall and the first and second magnetic or magnetically attractable elements are attracted to one another, the abrasive surface and the soft surface contact respective inner and outer sides of the wall to allow cleaning of at least one side of the wall.

This summary is provided merely to introduce certain concepts and not to identify any key or essential features of the claimed subject matter. Further features and advantages of the invention, as well as the structure and operation of various embodiments of the invention, are described in detail below with reference to the accompanying drawings.

BRIEF DESCRIPTION OF THE DRAWING FIGURES

The foregoing and other features and advantages of the invention will be apparent from the following, more particular description of some example embodiments of the invention, as illustrated in the accompanying drawings. Unless otherwise indicated, the accompanying drawing figures are not to scale. Several embodiments of the invention will be described with respect to the following drawings, in which like reference numerals represent like features throughout the figures, and in which:

FIG. 17 depicts a schematic and illustrative assembled side view of a first (inner) member, or inner cleaning assembly, of a cleaning device according to yet another embodiment of the invention;

FIG. 18 depicts a schematic and illustrative disassembled side view of the first (inner) member, or inner cleaning assembly, of FIG. 17;

DETAILED DESCRIPTION

Various embodiments of the invention are discussed in detail below. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 1:
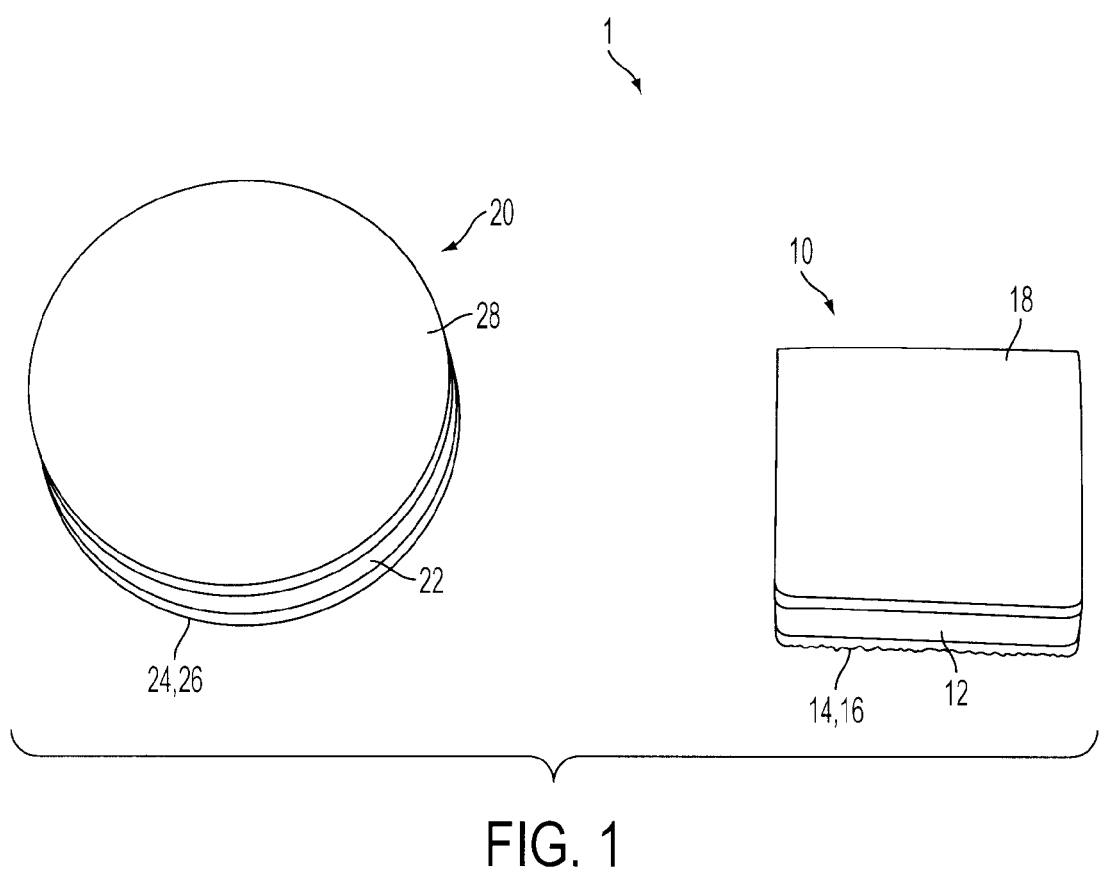
FIG. 1 depicts a perspective view of a cleaning device including first (inner) and second (outer) members according to an embodiment of the invention.

FIG. 1 depicts a perspective view of an aquarium wall or window cleaning device 1 according to a first example embodiment of the invention. The cleaning device 1 may include a first (inner) member 10, or inner cleaning assembly, and a second (outer) member 20, or outer assembly. The first (inner) member 10 may include a flexible main body 12 to which a first layer 14 and a second layer 18 may be attached. The first layer 14 may include an abrasive cleaning surface 16. The second layer 18 may be, for example, a product label. A first magnetic or magnetically attractable element (not shown) may be disposed within the main body 12. The second (outer) member 20 may include a flexible main body 22 to which a first layer 24 having, for example, a soft fabric or cloth surface 26, may be attached. A second magnetic or magnetically attractable element (not shown) may be disposed within the main body 22. The second (outer) member 20 may also include a product label 28 attached to a side of the main body 22 opposite layer 24.

Figure 2:
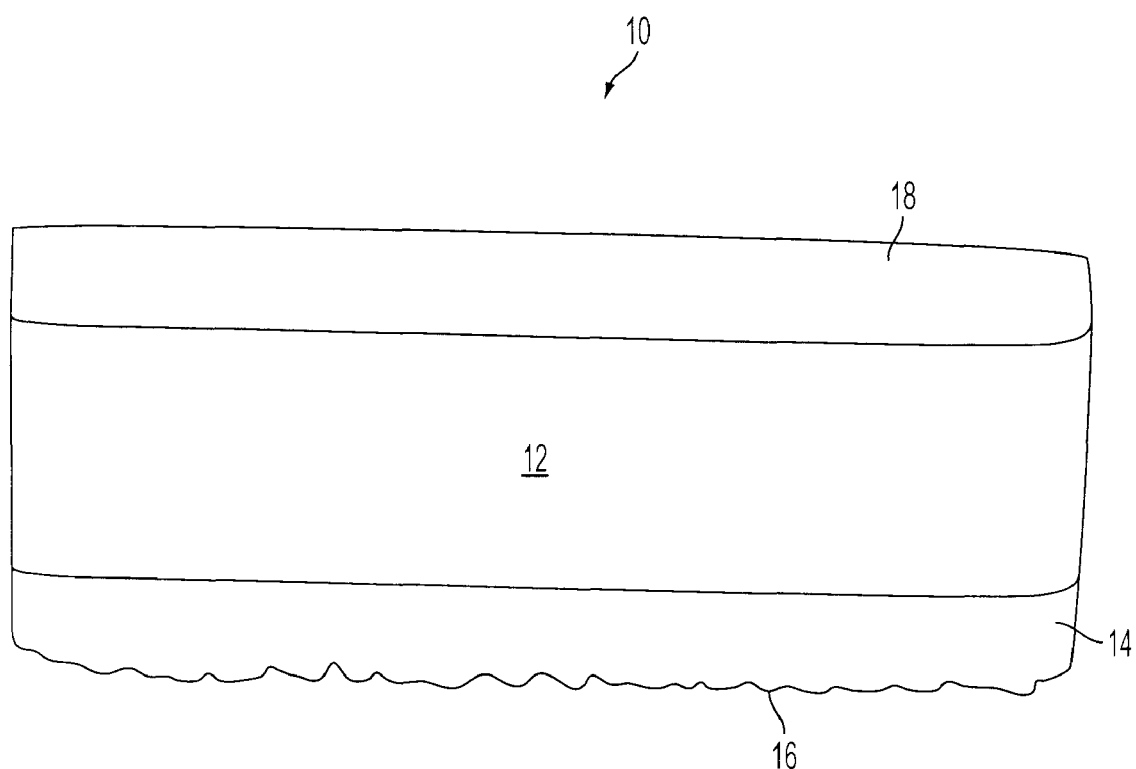
FIG. 2 depicts a side view of the first (inner) member of the cleaning device according to the embodiment shown in FIG. 1.

FIG. 2 depicts a more detailed side view of the first (inner) member 10 of the window cleaning device 1 shown in FIG. 1. The first (inner) member 10 may include flexible main body 12. Main body 12 may be formed of a buoyant material. Layer 14 may be attached to main body 12 and may have an abrasive surface 16. The first (inner) member 10 may also include product label 18 attached to a side of the main body 12 opposite layer 14.

Figure 3:
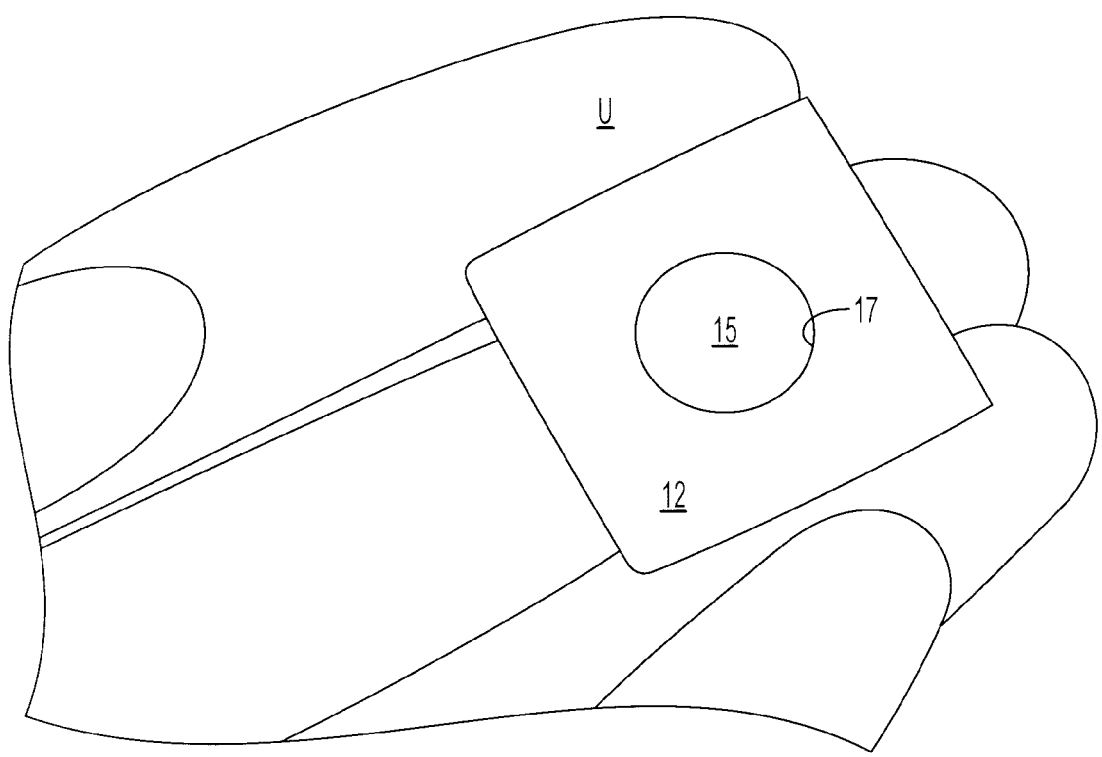
FIG. 3 depicts a bottom perspective view of the first (inner) member of the cleaning device of FIG. 1 in the hand of a user with an outer layer removed to show a magnetic or magnetically attractable member disposed within a main body.
Figure 4:
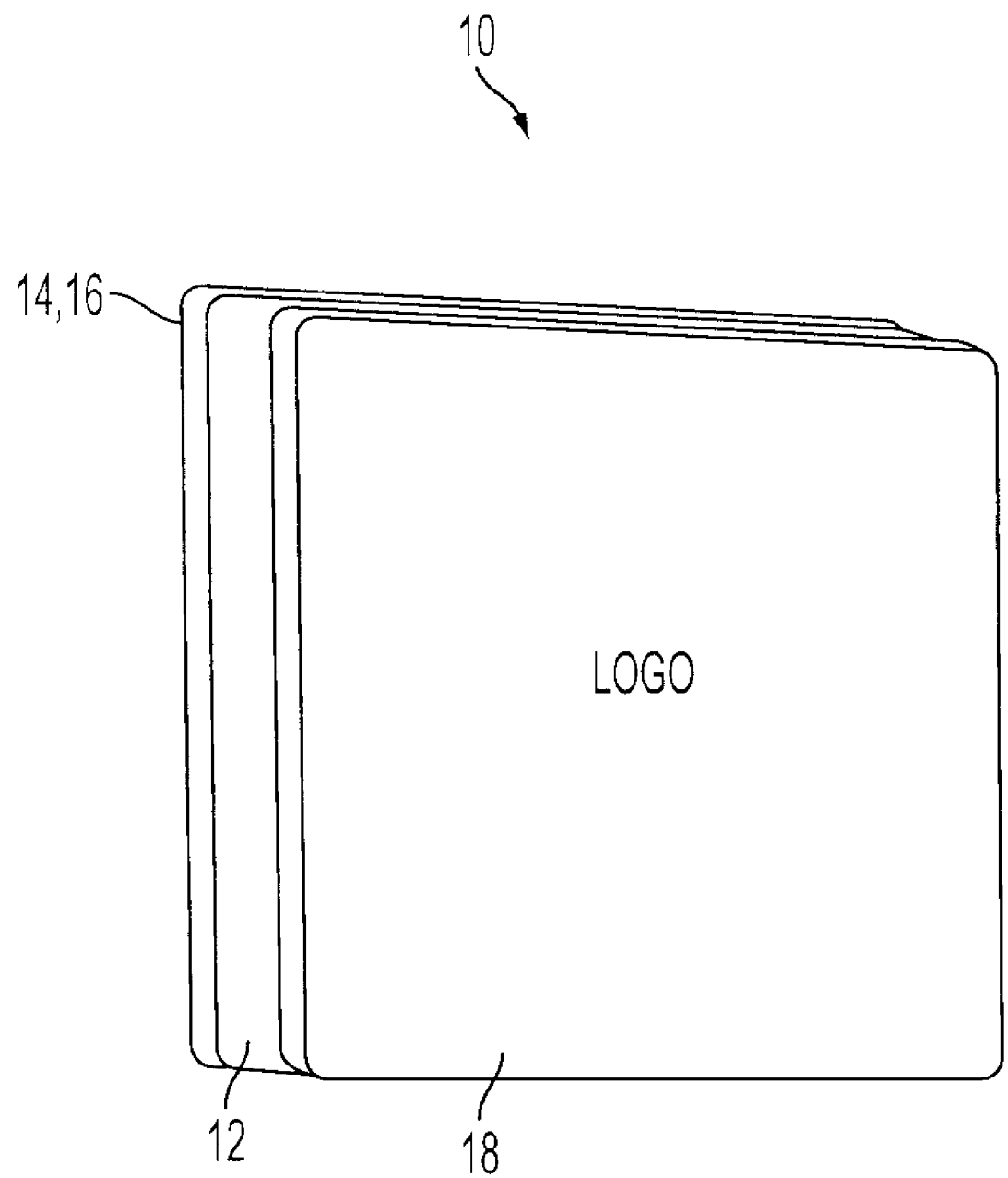
FIG. 4 depicts a perspective view of the first (inner) member of the cleaning device according to the embodiment of FIG. 1.

FIG. 3 depicts a bottom perspective view of the first (inner) member 10 of the cleaning device 1 of FIG. 1 in the hand of a user U with one of the layers 14 or 18 removed to show a magnetic or magnetically attractable member 15 disposed within a recess or through hole 17 in the main body 12. The magnetic or magnetically attractable member 15 may be, for example, a neodymium magnet, another type of magnet, or some magnetically attractable metallic material. FIG. 4 depicts a perspective view of the first (inner) member 10 of the cleaning device 1 showing layer 18 which may be a thin plastic layer including, for example, a product label.

Figure 5:
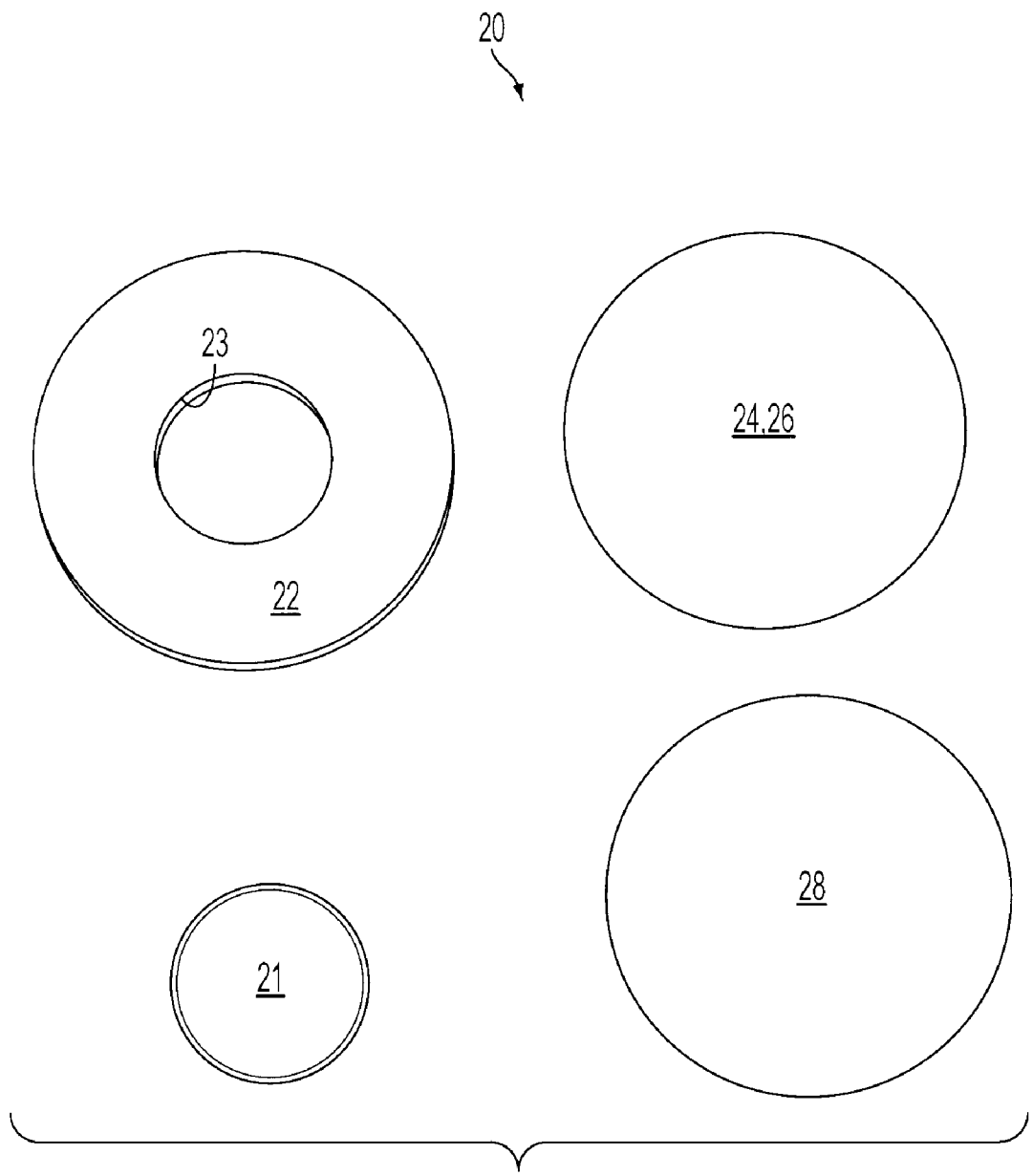
FIG. 5 depicts a disassembled top view of the second (outer) member of the cleaning device of FIG. 1.
Figure 6:
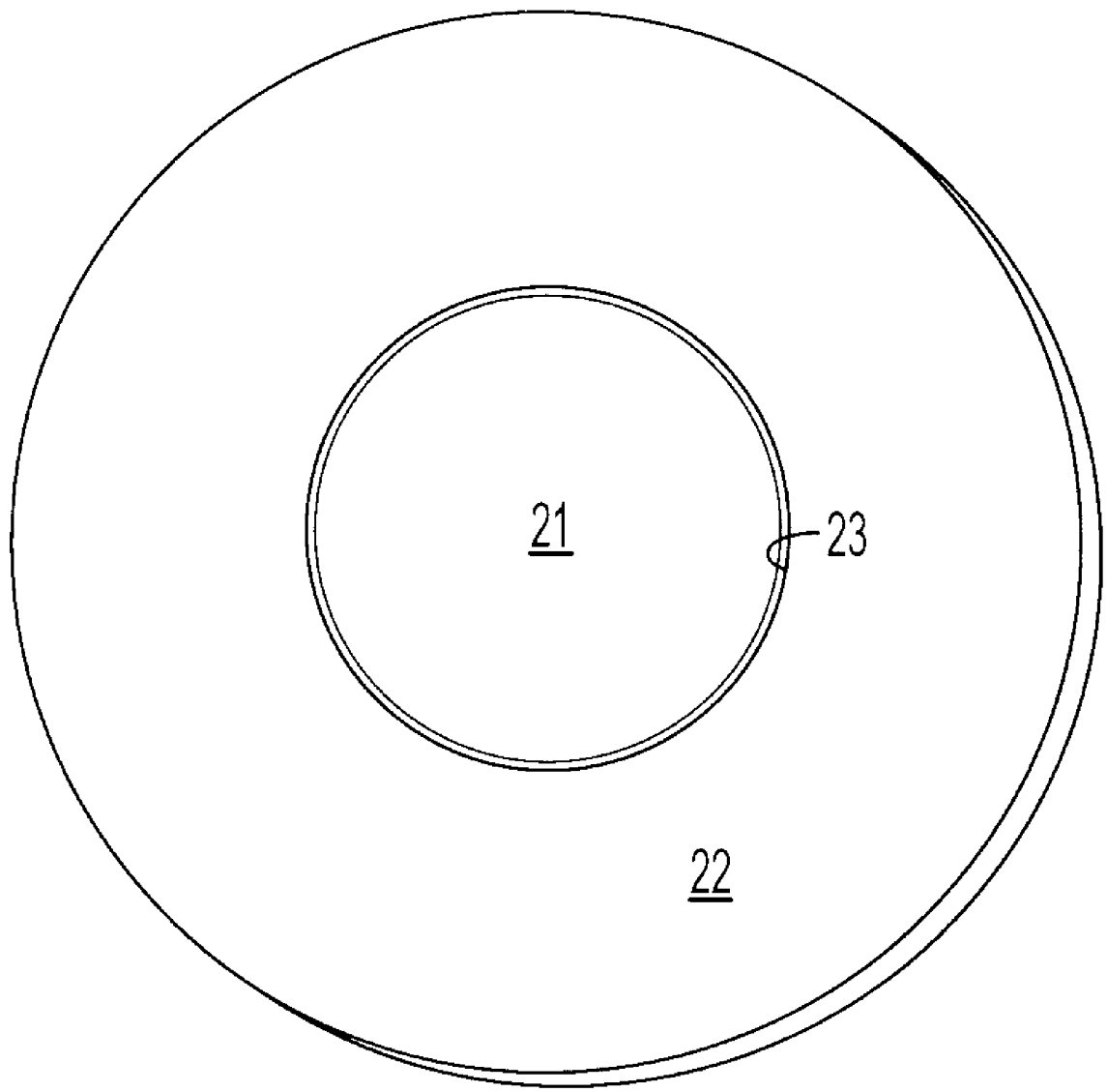
FIG. 6 depicts a top view of the second (outer) member of the cleaning device of FIG. 1 with an outer layer removed to show a magnetic or magnetically attractable member disposed within a main body.
Figure 7:
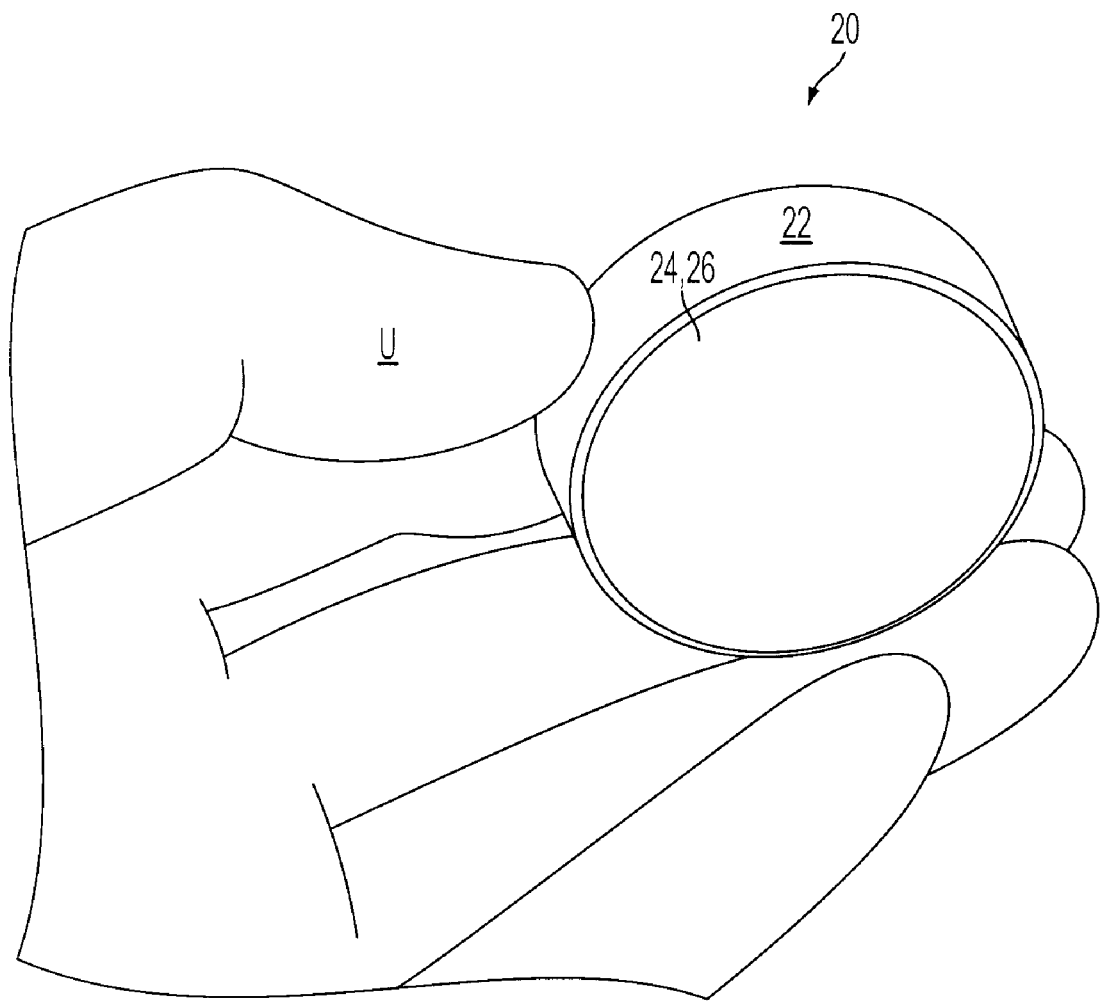
FIG. 7 depicts a bottom perspective view of the second (outer) member of the cleaning device of FIG. 1 in the hand of a user.
Figure 8:
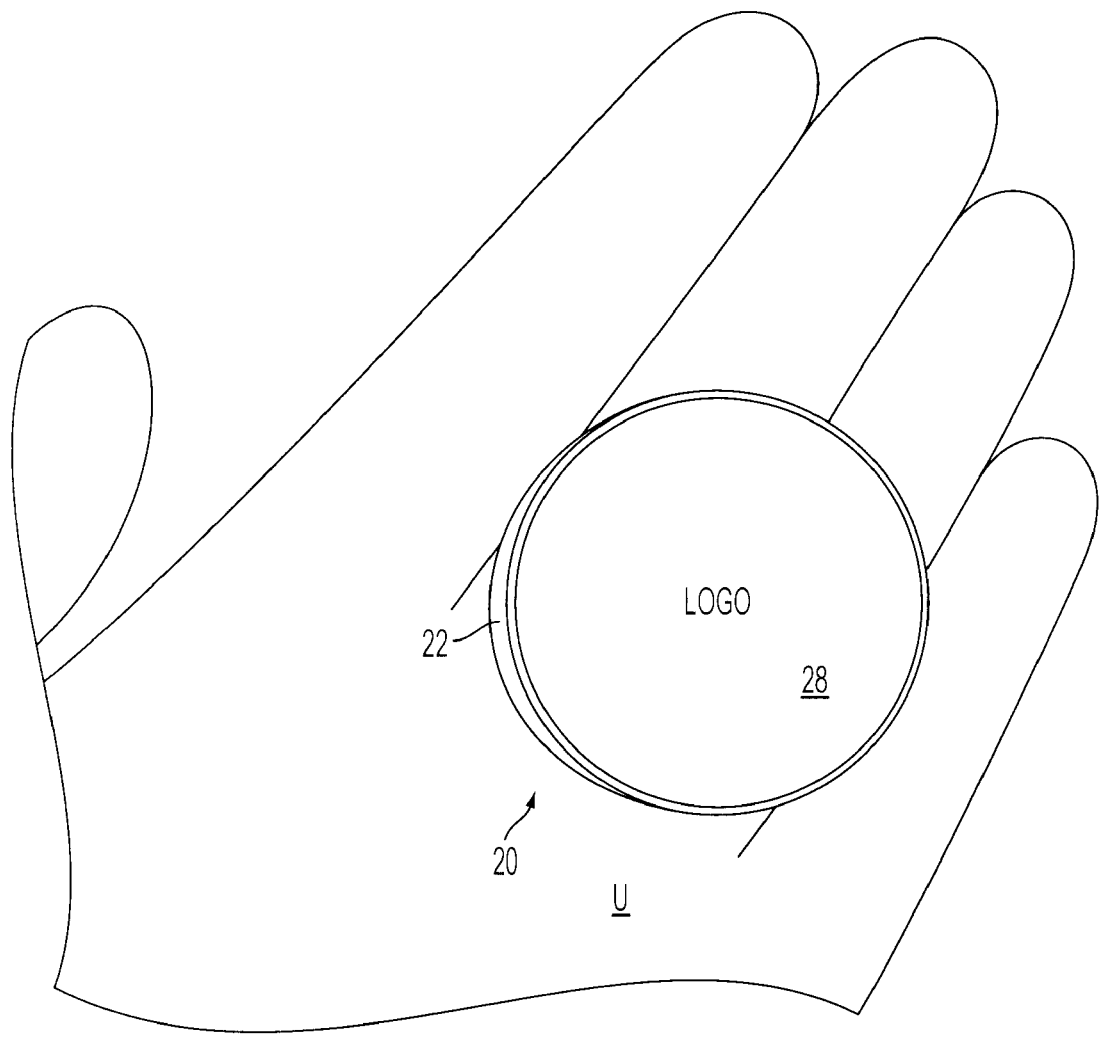
FIG. 8 depicts a top perspective view of the second (outer) member of the cleaning device of FIG. 1 in the hand of a user.

FIG. 5 depicts a disassembled top view of the second (outer) member 20 of the cleaning device 1 according to the embodiment shown in FIG. 1. The second (outer) member 20 may include main body 22 having a recess or through hole 23 configured to receive a magnetic or magnetically attractable member 21. The magnetic or magnetically attractable member 21 may be, for example, a neodymium magnet, another type of magnet, or some magnetically attractable metallic material so long as it is magnetically attracted to the magnetic or magnetically attractable member 15 disposed in the first (inner) member 10. The first layer 24 may be configured to be attached, for example, by adhesive, to a surface of the main body 22 and a second layer 28 may be configured to be attached, for example, by adhesive, to another surface of the main body 22 such that the member 21 is enclosed or sealed within the second (outer) member 20. The first layer 24 may have a soft fabric surface 26 for contacting, for example, an outer surface of an aquarium wall. FIG. 6 depicts a top view of the second (outer) member 20 of the cleaning device 1 with one of layers 24 or 28 removed to show the magnetic or magnetically attractable member 21 disposed within the through hole 23 of the main body 22. FIG. 7 depicts a bottom perspective view of the second (outer) member 20 of the cleaning device 1 of in the hand of a user U. Soft fabric surface 26 of layer 24 can be seen. FIG. 8 depicts a top perspective view of the second (outer) member 20 of the cleaning device 1 in the hand of user U. The product label layer 28 can be seen.

Figure 9:
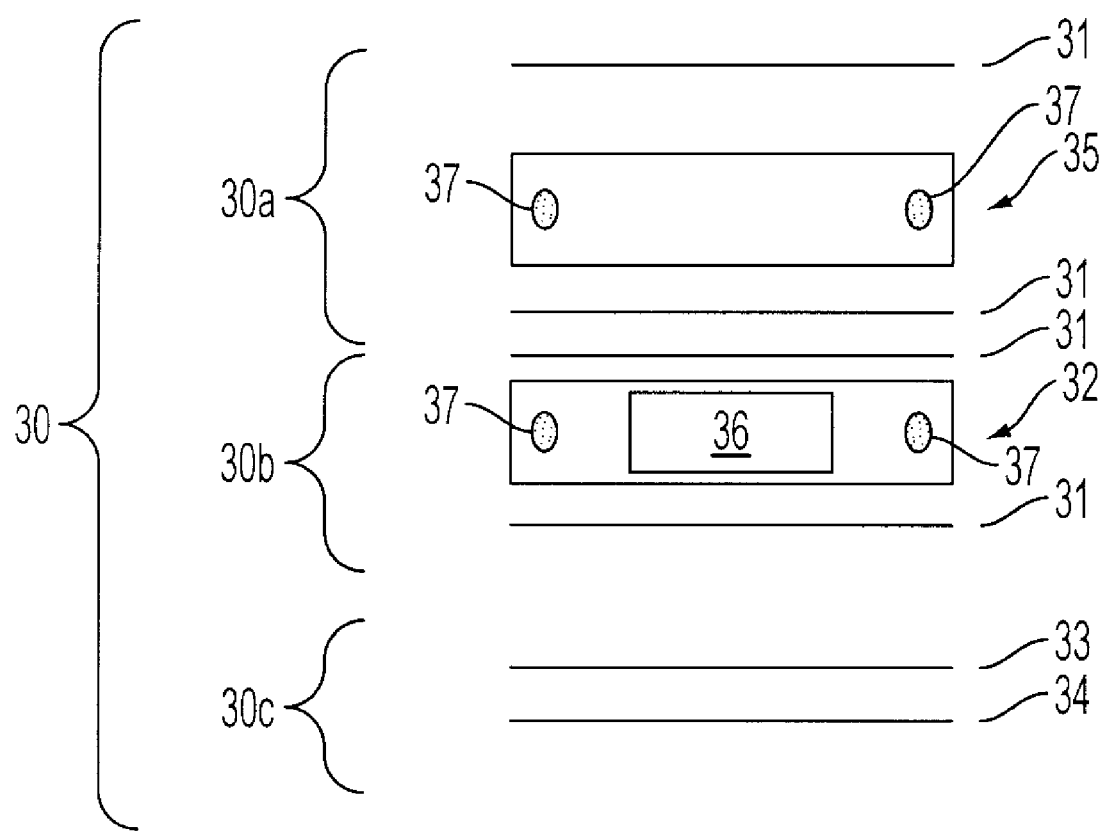
FIG. 9 depicts a schematic and illustrative exploded side view of a first (inner) member, or inner cleaning assembly, of a cleaning device according to another embodiment of the invention.
Figure 10:
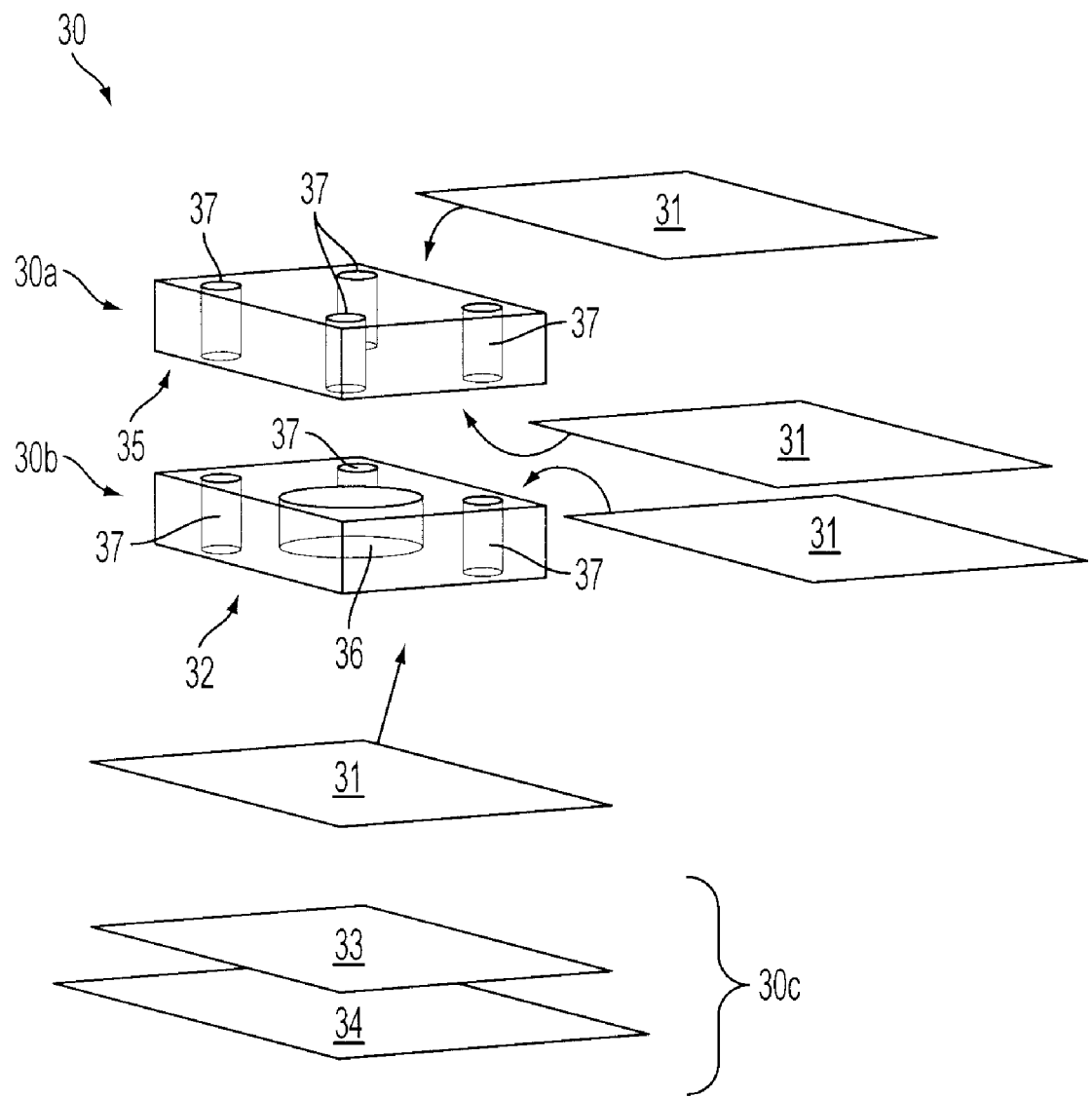
FIG. 10 depicts a schematic and illustrative exploded perspective view of the inner cleaning assembly of FIG. 9.

FIG. 9 depicts a schematic and illustrative exploded side view of a first (inner) member 30, or inner cleaning assembly, of a cleaning device according to another embodiment of the invention. FIG. 10 depicts a schematic and illustrative exploded perspective view of the inner cleaning assembly 30 of FIG. 9. The first (inner) member 30 may include at least three elements: a first accessory attachment element 30*a*, a main body element 30*b*, and a second accessory attachment element 30*c*. The first accessory attachment element 30*a* may include one or more layers of adhesive-backed plastic film 31 which may, for example, include product identification information. The first accessory attachment element 30a may further include a body portion 35 containing one or more magnetic or magnetically attractable elements 37 such as, for example, neodymium magnets. The body portion 35 may be formed from a flexible buoyant material such as, for example, cross-linked polyethylene foam, also known as "EVA" or ethylene vinyl acetate. Other similar materials could also be used.

The main body element 30b of the first (inner) member 30 may include a main body portion 32 containing a primary magnetic or magnetically attractable element 36 as well as one or more magnetic or magnetically attractable elements 37. One or both of the elements 36, 37 could be, for example, neodymium magnets. The first accessory attachment element 30a and the main body element 30b may be removably coupled to each other due to magnetic attraction between respective elements 37 in each. Element 36 may be magnetically attracted to a magnetic or magnetically attractable member in a second (outer) member 20 such as, for example, as described above with reference to the embodiment depicted in FIGS. 1 and 5-8. The main body portion 32 of the main body element 30b may be formed from a flexible buoyant material such as, for example, cross-linked polyethylene foam, also known as "EVA" or ethylene vinyl acetate. Other similar materials could also be used. The main body element 30b may further include one or more layers of adhesive-backed plastic film 31 attached to the main body portion 32. Plastic film 31 may, for example, include product identification information.

The second accessory attachment element 30c may include a layer of thin magnetic tape 33 attached to a layer of adhesive-backed hook and loop fastener material 34 (e.g., Velcro®) which may be used as a cleaning or scrubbing surface for the first (inner) member 30. The second accessory attachment element 30c may be removably coupled to the main body element 30b by magnetic attraction between the thin magnetic tape 33 and one or both of the elements 36,37 in the main body portion 32.

Figure 11:
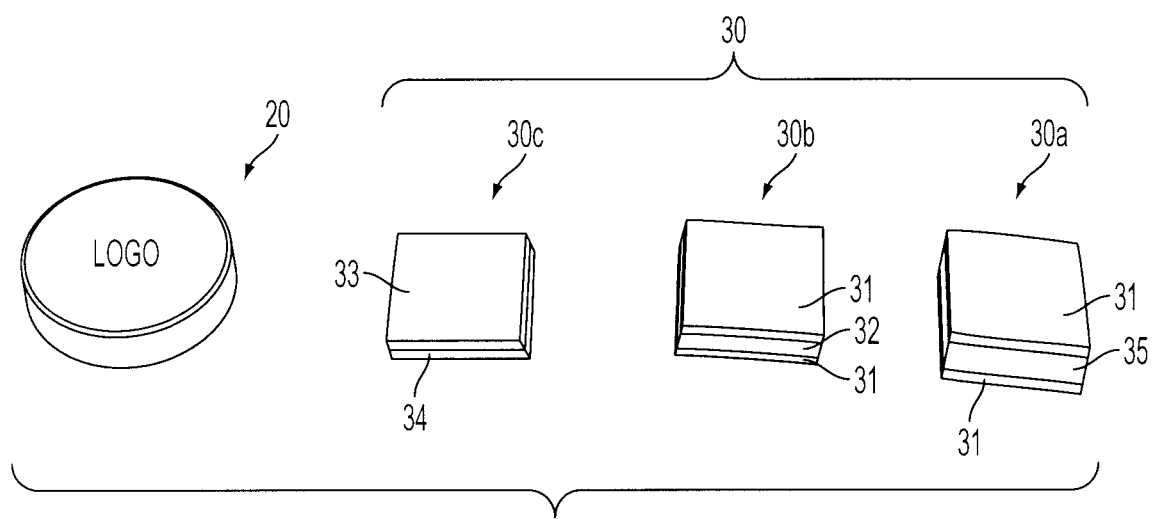
FIG. 11 depicts a perspective view of the inner cleaning assembly of FIG. 9 in a partially disassembled state and positioned next to a fully assembled second (outer) member or outer cleaning assembly of the cleaning device according to an embodiment of the invention.
Figure 12:
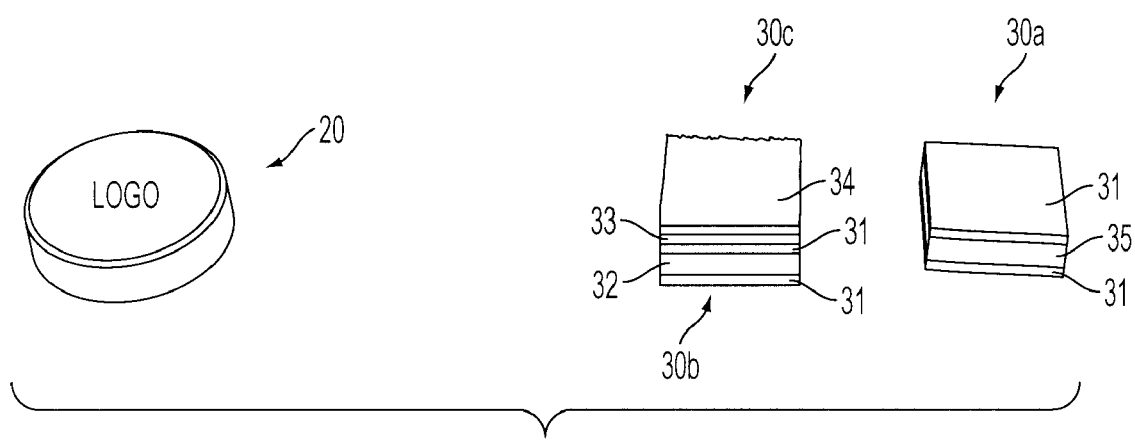
FIG. 12 depicts a perspective view of the cleaning device according to the embodiment shown in FIGS. 9-10.
Figure 13:
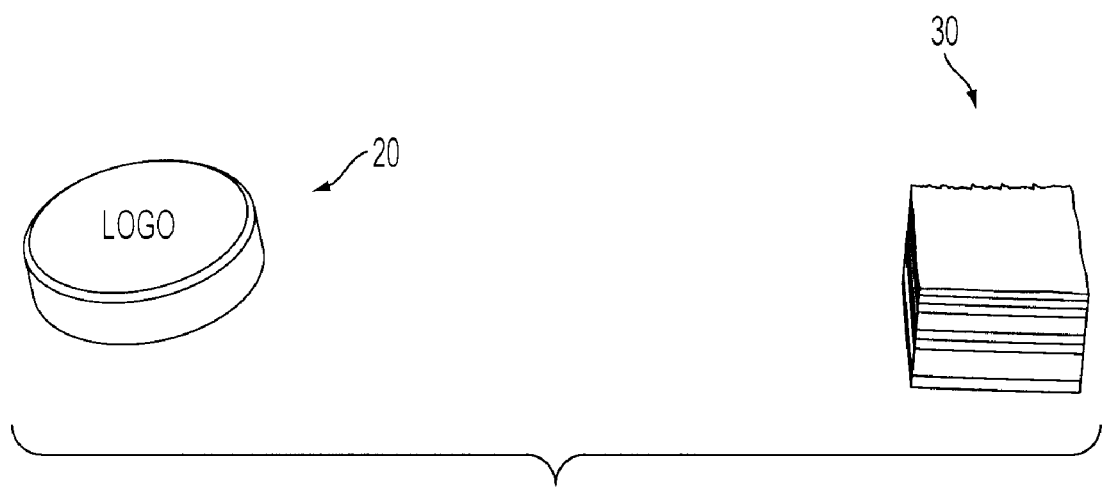
FIG. 13 depicts a perspective view of the cleaning device according to the embodiment shown in FIGS. 9-12.
Figure 14:
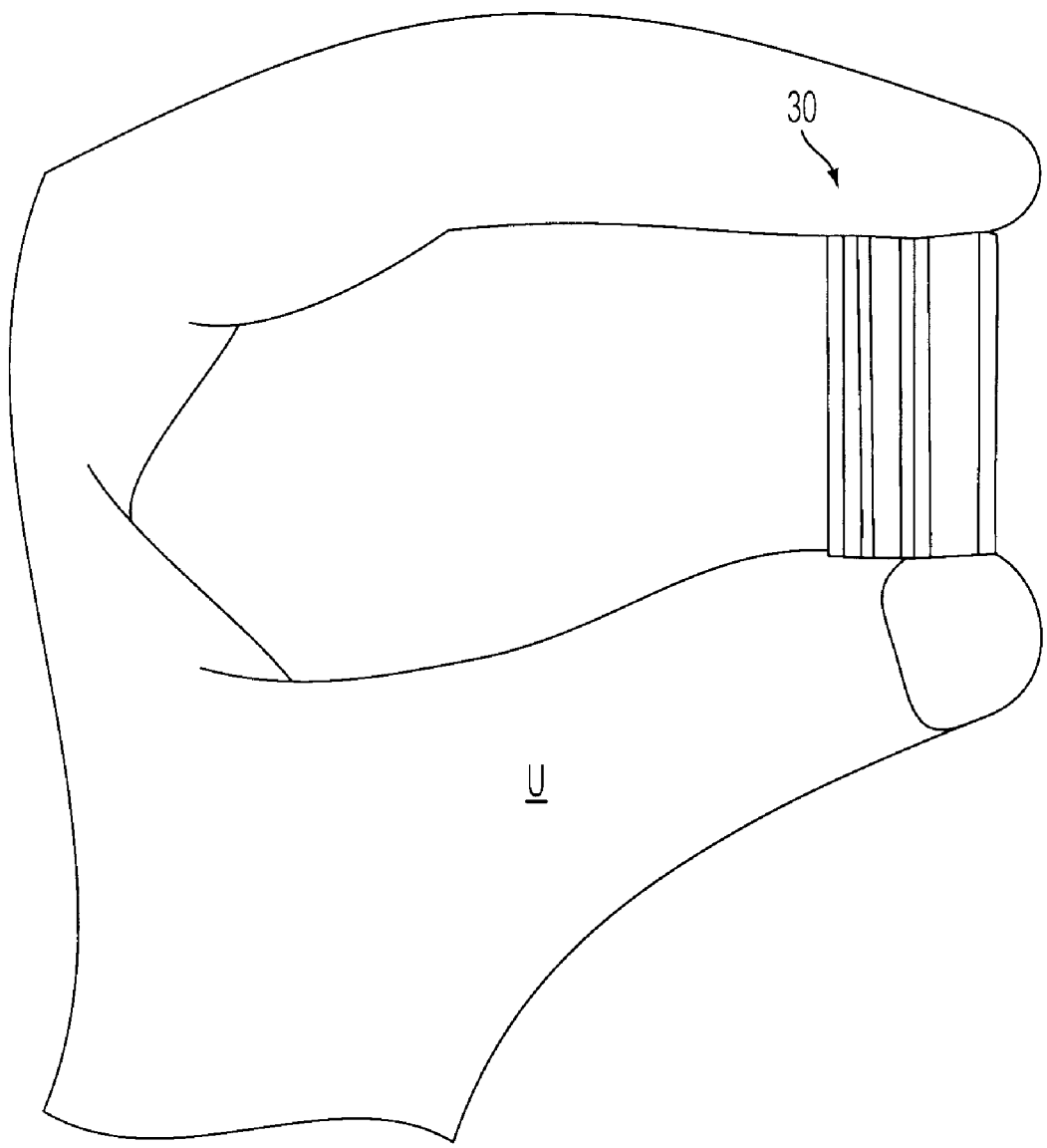
FIG. 14 depicts a side view of the first (inner) member or inner cleaning assembly of FIGS. 9-13 in the hand of a user.

FIGS. 11-13 depict a perspective view of the inner cleaning assembly 30 of FIGS. 9-10 in partially disassembled and assembled states and positioned next to a fully assembled second (outer) member 20 or outer cleaning assembly of the cleaning device (as discussed above) according to an embodiment of the invention. FIG. 14 depicts a side view of the first (inner) member 30 or inner cleaning assembly of FIGS. 9-13 in the hand of a user U.

Figure 15:
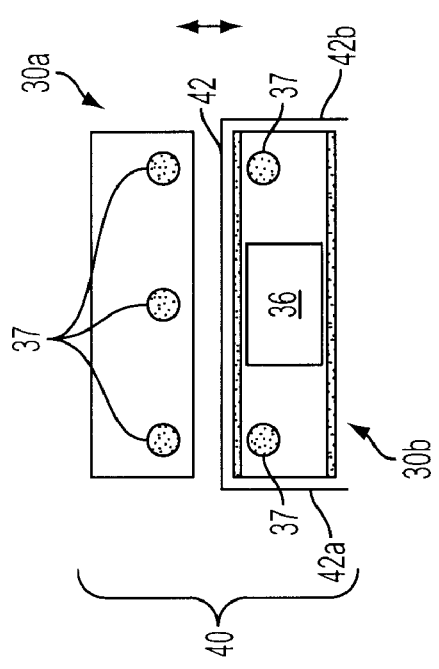
FIG. 15 depicts a schematic and illustrative assembled side view of a first (inner) member, or inner cleaning assembly, of a cleaning device according to still another embodiment of the invention.
Figure 16:
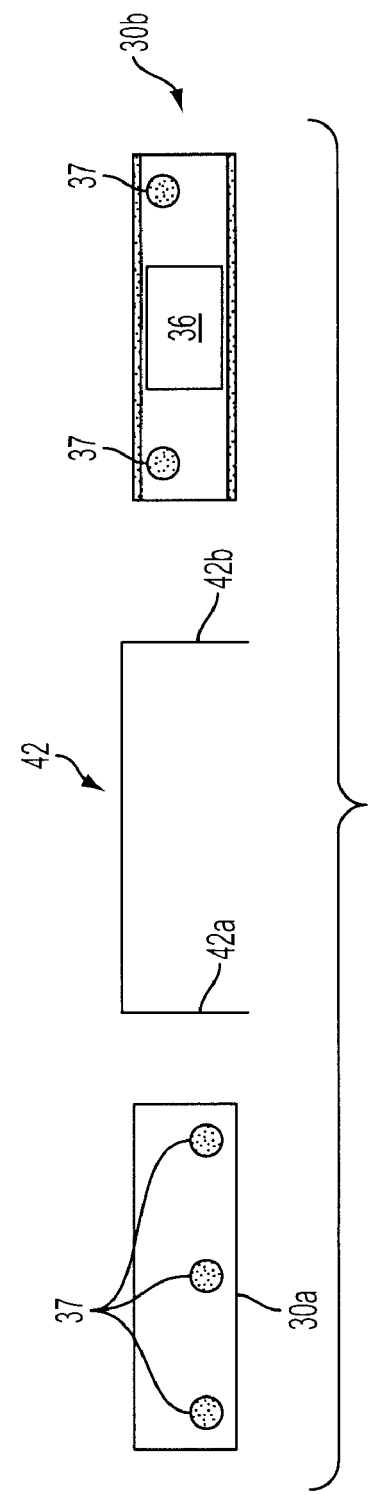
FIG. 16 depicts a schematic and illustrative disassembled side view of the first (inner) member, or inner cleaning assembly, of FIG. 15.

FIG. 15 depicts a schematic and illustrative assembled side view of a first (inner) member 40, or inner cleaning assembly, of a cleaning device according to still another embodiment of the invention. FIG. 16 depicts a schematic and illustrative disassembled side view of the first (inner) member 40, or inner cleaning assembly, of FIG. 15. The first (inner) member 40 may include at least two elements: an accessory attachment element 30a and a main body element 30b, for example, as described above with reference to FIGS. 9-10. Although not shown in FIGS. 15-16, a second accessory attachment element 30c as described above with reference to FIGS. 9-10 may also be included and removably coupled to the main body element 30b. The accessory attachment element 30a and the main body element 30b may include one or more layers of adhesive-backed plastic film 31 which may, for example, include product identification information. A cleaning or scraping element 42 may be included and removably secured between the accessory attachment element 30a and the main body element 30b. The cleaning or scraping element 42 may be U-shaped so as to include a pair of leg extensions 42a, 42b preferably sized such that the main body element 30b can be received within the U-shape. The cleaning or scraping element 42 may be, for example, a bent metal structure (e.g., stainless steel) or a molded piece of plastic (e.g., polyethylene). Other similar materials may also be sufficient for forming element 42. The leg extensions 42a, 42b of the cleaning or scrubbing element 42 should have a slightly longer dimension than a thickness of the main body element 30b. When the cleaning or scraping element 42 is removably secured between the accessory attachment element 30a and the main body element 30b and the first (inner) member 40 is positioned, for example, on an inner wall of an aquarium, the leg extensions 42a, 42b contact the wall and scrape the same during use.

FIG. 17 depicts a schematic and illustrative assembled side view of a first (inner) member 50, or inner cleaning assembly, of a cleaning device according to yet another embodiment of the invention. FIG. 18 depicts a schematic and illustrative disassembled side view of the first (inner) member 50, or inner cleaning assembly, of FIG. 17. The first (inner) member 50 may be substantially the same as the first (inner) member 40 described above with reference to FIGS. 16-17 except that the accessory attachment element 30a of member 40 may be replaced with a U-shaped accessory attachment member 56. As shown in FIGS. 17-18, the first (inner) member 50 may include a main body element 52 containing a primary magnetic or magnetically attractable element 54. The element 54 could be, for example, a neodymium magnet. The U-shaped accessory attachment member 56 may include a magnetic or magnetically attractable element 55 contained therein and may define a recessed portion 58 of a sufficient shape to size to receive the main body element 52 and a cleaning or scraper element 42 such as disclosed above with reference to FIGS. 15-16. One or both of the main body element 52 and/or the accessory attachment element 56 may be formed from a flexible buoyant material such as, for example, cross-linked polyethylene foam, also known as "EVA" or ethylene vinyl acetate. Other similar materials could also be used. The cleaning or scraping element 42 may be, for example, a bent metal structure (e.g., stainless steel) or a molded piece of plastic (e.g., polyethylene). Other similar materials may also be sufficient for forming element 42. The leg extensions 42a, 42b of the cleaning or scrubbing element 42 should have a slightly longer dimension than a thickness of the main body element 52. When the cleaning or scraping element 42 is removably secured between the accessory attachment element 56 and the main body element 52 and the first (inner) member 50 is positioned, for example, on an inner wall of an aquarium, the leg extensions 42a, 42b contact the wall and scrape the same during use. Although not shown in FIGS. 17-18, a second accessory attachment element 30c such as described above with reference to FIGS. 9-10 may also be included and removably coupled to the main body element 52. The accessory attachment element 56 and the main body element 52 may include one or more layers of adhesive-backed plastic film 31 which may, for example, include product identification information.

In another embodiment, the main body 22 could be formed from a rigid material or eliminated such that the second (outer) member 20 could be simply a square or rectangular neodymium magnet, for example, with adhesive backed felt covering 24 on one side and a label 28 with identification markings on the other side. This would lose the advantages of the soft foam material for the second (outer) member 20, which gives it a nice "feel" in the hand and a flexible quality. An advantage of this variation, however, is that it may allow for a very strong pull for the second (outer) member 20, giving it the capacity to work on thick glass even when paired with a small first (inner) member 10.

In still another embodiment of the invention, the main body 12 of the first (inner) member 10, or inner cleaning assembly, could be a coating such as, for example, a thin layer of polymer, epoxy, silicone, or plastic material. The magnet or magnetically attractable element 15 could be covered or enclosed within the coating. For example, the magnetic or magnetically attractable elements could be set into a liquid cast material that is buoyant and flexible when it cures. Such material could retain the thinness and flexibility advantages of the die-cut foam sheets. A layer of scrubbing material 16 such as, for example, adhesively-backed hook and loop fastener material, could be attached to one or more outer surfaces of such coating.

The device does not include any plastic molded bodies, and the magnetic or magnetically attractable elements may be housed within the flexible buoyant material itself, eliminating the need for an air pocket, and providing the following advantages: the first (inner) member 10 can be made very small and/or very thin; the first (inner) and second (outer) members 10, 20 can be flexible, allowing them to conform to curved surfaces; the construction is very simple, using readily available inexpensive materials that can be assembled by hand quickly and inexpensively. No molds are required.

In another example embodiment, the first (inner) member 10 may be constructed so that it is nearly neutrally buoyant and/or slightly negatively buoyant. This feature may afford some significant advantages such as, for example, providing only slight resistance against the magnetic force during use. In this regard, a nearly neutrally buoyant or slightly negatively buoyant first (inner) member 10 may be stronger as a glass cleaner than a floating (buoyant) version because it does not have to overcome the tendency to float, but instead evenly distributes a maximum amount of force against the glass. For the same reason, if the first member 10 falls to the bottom of the aquarium, its substantially neutrally buoyant or slightly negatively buoyant quality may make it easy for the second (outer) magnetic element 20 to attract it from a great distance. Furthermore, if the magnets become uncoupled while the user is cleaning the glass, it may be quite easy to "catch" the slowly falling inner element 10. The inner member 10 may also be thinner than the floating version, for example, by up to approximately 50%. The length, width, and thickness of the foam body of the inner member 10, as well as the number and weight of magnetic or magnetically attractable elements attached thereto, can be adjusted to achieve the ideal circumstance of nearly neutral, or slightly negative, buoyancy in a format that is as thin as possible.

In another embodiment, the buoyancy of the first (inner) member 10 may also be oriented, for example, by having a section of foam at one side edge (not shown) that lacks magnets or magnetically attractable elements such that the weight may be concentrated toward the opposite side. The section of foam may be, for example, attached to the first member 10 or formed integrally therewith.

The construction of the device may involve adhering sheets of polyethylene foam, also known as "EVA" or ethylene vinyl acetate, that have been die cut to size, die cut for the placement of the magnets, and coated with an adhesive so that the layers attach, forming a water-tight seal.

The inner member may have a die-cut adhesive layer of abrasive material (such as the hook side of a hook and loop fastener such as, for example, Velcro®) attached and the outer piece may have a die-cut adhesive layer of felt material attached.

The user places the inner member in the aquarium and the outer member, when placed against the aquarium wall, magnetically attracts the inner piece.

There is a market need for such a device made on a small scale (thin and small) for use in fish bowls and so-called "nano" reef aquariums. For larger aquariums with curved windows there is a need for a flexible cleaner.

In some embodiments, the outer member may be a round disk (e.g., cylindrical) for ease of gripping by hand and the inner piece or member may be square (e.g., a thin box shape or rectangular prism). Both the inner and outer members may be fitted with neodymium magnets, although ceramic magnets or other types could be used. A balance may be achieved considering the amount of buoyant material, the weight of the magnet and any other materials attached to the magnet, and the expected thickness of the aquarium window.

Larger versions may have multiple magnets inserted into die-cut openings in the inner member, and one or more magnets inserted into the outer member.

The foam material could be polyethylene, EVA, neoprene or any similar dense, flexible, buoyant closed-cell foam. The magnets could be any magnetic material, preferably with high strength.

The scrub pad or layer attached to the first (inner) member for cleaning the window surface can be any type of abrasive or non-abrasive material layer suited to the particular cleaning application. In addition, steel or stainless steel blades could be attached to the inner member to give it the ability to scrape off coralline algae or any substance that adheres strongly to the glass. See, e.g., FIGS. 16-18.

Variations on the design of the flexible inner member would allow it to be used effectively on acrylic windows that are easily scratched by hard plastic. Such design variations include several possibilities such as using soft cleaning surfaces, having contact on soft die-cut points only, and having tracks that prevent sand grains from getting trapped between the cleaning surface and the glass. For this purpose, it may also be possible to add an accessory attachment made from, for example, plastic, as shown in FIGS. 15-18.

In some embodiments, the outer member could be constructed the same way as the inner member. As a result, no molds need to be made. Furthermore, the outer member could then be flexible too such that it may feel good/soft in the hand of a user.

In an example embodiment (see, e.g., FIGS. 1 and 2), the window cleaning device may be made, for example, as follows: The main bodies 12, 22 of the first flexible member 10 and second flexible member 20 may be made from a flexible buoyant closed-cell foam material such as, for example, cross linked polyethylene, EVA, Neoprene, or similar dense foam sheet, die cut to form specific shapes. The first and second magnetic or magnetically attractable elements 15, 21 may be neodymium magnets. The abrasive layer 14 attached on a side of the main body 12 of the first flexible member 10 and arranged to contact the window may be the hook side of Velcro® or similar plastic abrasive sheet material with an adhesive backing. The soft layer 24 attached on a side of the main body 22 of the second flexible member 20 and arranged to contact the window may be, for example, a felt material with an adhesive backing. A plastic or vinyl label 18, 28 with identifying features (e.g., product name, company logo) may be attached to the surfaces of the main bodies 12, 22 opposite the abrasive layer 14 and the soft layer 24. The label 18, 28 may have printing on one surface and an adhesive backing on another surface.

Flexible buoyant closed-cell foam material (e.g., cross linked polyethylene, EVA, Neoprene, or similar dense foam sheet) may be used to make two die-cut parts 12, 22. In an example embodiment, the main body 22 of the second flexible member 20 may be round and cut from ½ inch thick sheet. It may have a hole 23 cut out of the center so that it is shaped like a flattened doughnut or round disk. The main body 12 of the first flexible member 10 may be, in an example embodiment, square and cut from ¼ inch sheet, with a hole 17 cut out of the center.

The holes in the abovementioned parts may be sized just slightly smaller than the diameter of the round neodymium magnets that will be inserted into them. The smaller diameter of the hole allows it to hold the magnet—the foam is soft and accommodates the slightly larger diameter of the magnet without distorting the shape of the member. It may also be possible or preferable to make the hole larger than the magnet diameter, and to fill the gap with a potting epoxy compound so that the magnet is completely coated and protected from contact with water. In an example embodiment of the window cleaning device, the second member 20 may have a diameter, for example, of 1.5 inches and the first member may be 1 square inch. The hole 23 in the main body 22 of the second member 20 may be, for example, slightly less than ½ inch in diameter, and the hole 17 in the main body 12 of the first member 10 may be, for example, slightly less than 3/16 inches in diameter.

The window cleaning device 1 shown may be particularly designed for use in small aquariums and fishbowls. One of ordinary skill will recognize, however, that the main bodies 12, 22 of the first and second members 10, 20 could be cut to any shape and have numerous holes to accommodate numerous magnets, allowing the product to be developed in larger sizes and different configurations. Larger sized pieces, for example, may be more flexible, which allows them to better conform to curved surfaces.

The size of the neodymium magnets in the inner and outer members may be the same as, or different from, one another. In either case, it is possible to use single magnets with the appropriate diameter and thickness, or a stack of thinner magnets of the appropriate diameter.

For the second (outer) member 20, a larger diameter magnet or magnetic material may be used to make the device as strongly magnetic as possible, with the thickness being limited by the thickness of the main body 22 of the second member 20. The thickness of the magnet should be slightly less than the thickness of the main body 22 of the second member 20. The maximum diameter of the magnet inserted into the second member 20 is limited by cost, while the minimum diameter is limited by the strength required to provide: a) adequate pull force through the window to hold the first (inner) member 10 in position and b) adequate pull force through the window to make the first (inner) member 10 bear down on the glass strongly so that it is effective at scrubbing off algae, dust, etc.

For the first (inner) member 10 the thickness of the magnet (s) could be slightly less than the thickness of the main body 12, but it need not be so thick. The diameter should be as wide as possible to provide a force over as wide a surface area as possible to maximize the force on the window to give effective cleaning ability. The limit to both the diameter and thickness of the magnet used for the first (inner) member 10 is its weight, since the first (inner) member 10 is intended to float as a result of the buoyant material of the main body 12 of the first flexible member 10. If the magnet is too big (heavy), the first (inner) member 10 does not float.

The neodymium magnets used may be made with an epoxy coating to provide resistance to corrosion. Normally the design of the device prevents any contact of the magnets with water, but if the foam or sealing sheets become punctured, the magnets could come in contact with water.

The first (inner) member 10 of the device 1 may have a surface that is abrasive so that it easily removes algae growing on the glass window. The abrasive surface 16 of layer 14 must not be so abrasive that it scratches glass or acrylic. The abrasive surface 16 may be a short, plastic brush-like material, such as, for example, the "hook" side from various manufactured hook-and-loop closure products commonly referred to by the brand name Velcro®, but not limited to that brand. An adhesive backing may allow layer 14 to form a water-tight seal with the main body 12 of the first flexible member 10. The seal protects the magnet against corrosion.

Layer 24 of the second (outer) member 20 of the device 1 may have a surface 26 that is soft and "low friction" so that it slides easily across the window as the user moves it. The soft, flexible surface 26 may be, for example, felt or chenille-type material. An adhesive backing may allow layer 24 to form a water-tight seal with the main body 22 of the second flexible member 20, even though the second flexible member 20 is not used in the water. The seal may protect the magnet against corrosion.

Two plastic labels 18, 28 may be used to seal the sides of the first flexible member 10 and the second flexible member 20 opposite the location of the abrasive material and the felt material, respectively. On the second (outer) member 20, the label 28 may be cut to the same size as the felt material 24 and on the first (inner) member 10, the label 18 may be cut to the same size as the abrasive material 14. The labels 18, 28 may be plastic or vinyl, for example, to provide water resistance and to form a water-tight seal, effectively enclosing the magnets in the main bodies 12, 22 of the first flexible member 10 and second flexible member 20. The labels 18, 28 may also provide product identity information. The material used should not be so thin that it can be punctured easily, nor so thick that it substantially reduces the flexibility of at least the first (inner) member 10. Alternatively, or in combination with the labels 18, 28, a potting epoxy compound may be used so that the magnet is completely coated and protected from contact with water.

Example Instructions for Assembly

The magnets may be inserted into the main bodies 12, 22 of the first and second flexible members 10, 20.

The first and second flexible members 10, 20 may be placed on opposite sides of a sheet of glass, acrylic, wood, or other suitable flat rigid material (hereinafter referred to as "the board") so that they are naturally attracted to each other and held in place.

Adhesive backed abrasive material 14 may be attached to the side of the main body 12 against the board for the first flexible member 10.

Adhesive backed soft (e.g., felt-like) material 24 may be attached to the side of the main body 22 against the board for the second flexible member 20.

Use of the board may help assure that the magnets are oriented correctly.

Lastly, labels may be attached to seal and/or cover the opposite sides of the main bodies 12, 22 of the first and second flexible members 10, 20.

Example Dimensions

Some example dimensions for the various elements have been discussed above. An advantage of this design may be that the first (inner) member 10 can be extremely thin, allowing it to slip into spaces that other magnetic window cleaners cannot go. This design may also allow for a second (outer) member 20 that is extremely small. In an embodiment, the first (inner) member 10 may be, for example, 1 inch square and approximately ¼ inch thick. It could also, for example, be made even smaller, using a smaller neodymium magnet.

How Cut

The main bodies 12, 22 of the first and second flexible members 10, 20, the felt sheet 24, the abrasive sheet 14, and the labels 18, 28 may all be die-cut pieces. There are no molded parts in the device, unlike other known devices of this sort.

Example Uses of the Device

The user places the first (inner) member 10 in the aquarium and then holds the felt side of the second (outer) member 20 near it to attract it to the window to be cleaned. The first (inner) member 10 may readily "swim" toward its magnetic partner due to its neutral or negative buoyancy.

The user may move the second (outer) member 20 back and forth along the window or wall of the aquarium. The first (inner) member 10 follows this movement. The user thus can direct the first (inner) member 10 over areas where there is algae or dust deposited on the glass, and the abrasive surface 14 on the first (inner) member 10 wipes these deposits off.

If for some reason the second (outer) member 20 becomes uncoupled from the first (inner) member 10, the neutral or negative buoyancy of the first (inner) member 10 may make it easy to "catch" the first (inner) member 10 with the attraction to the second (outer) member 20.

Figure 19:
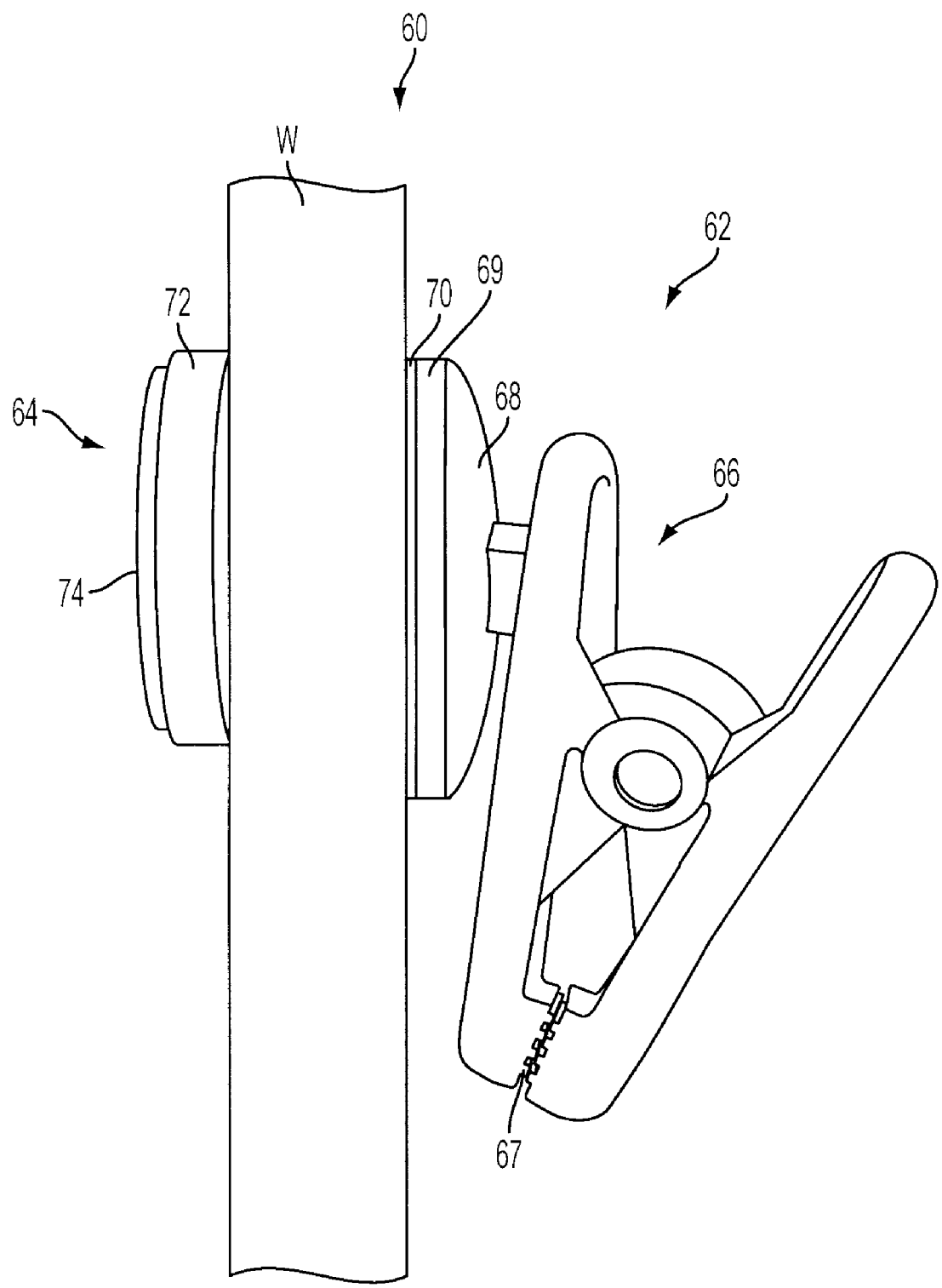
FIG. 19 depicts a side view of a magnetic feeder device for an aquarium wall according to an embodiment of the invention.
Figure 20:
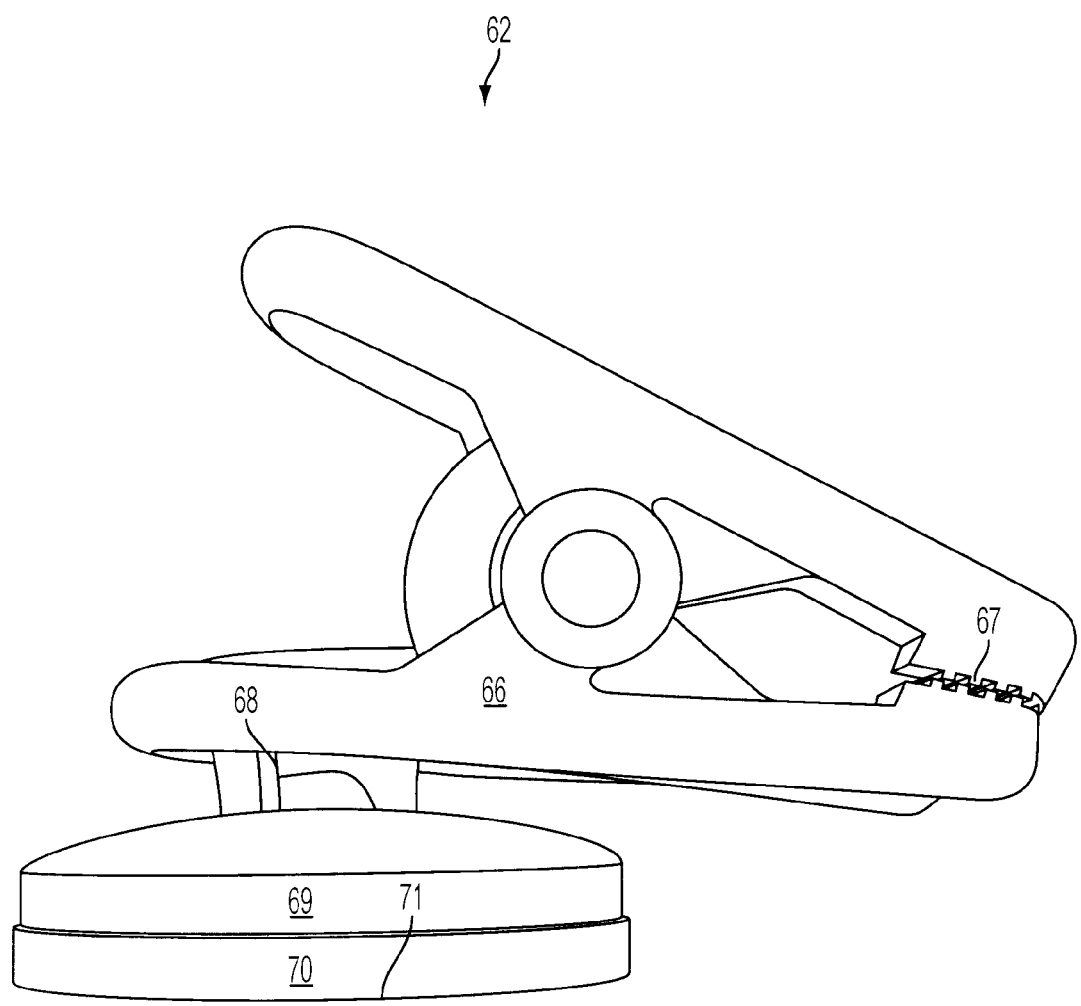
FIG. 20 depicts a side view of a first (inner) assembly of the magnetic feeder device of FIG. 19.
Figure 21:
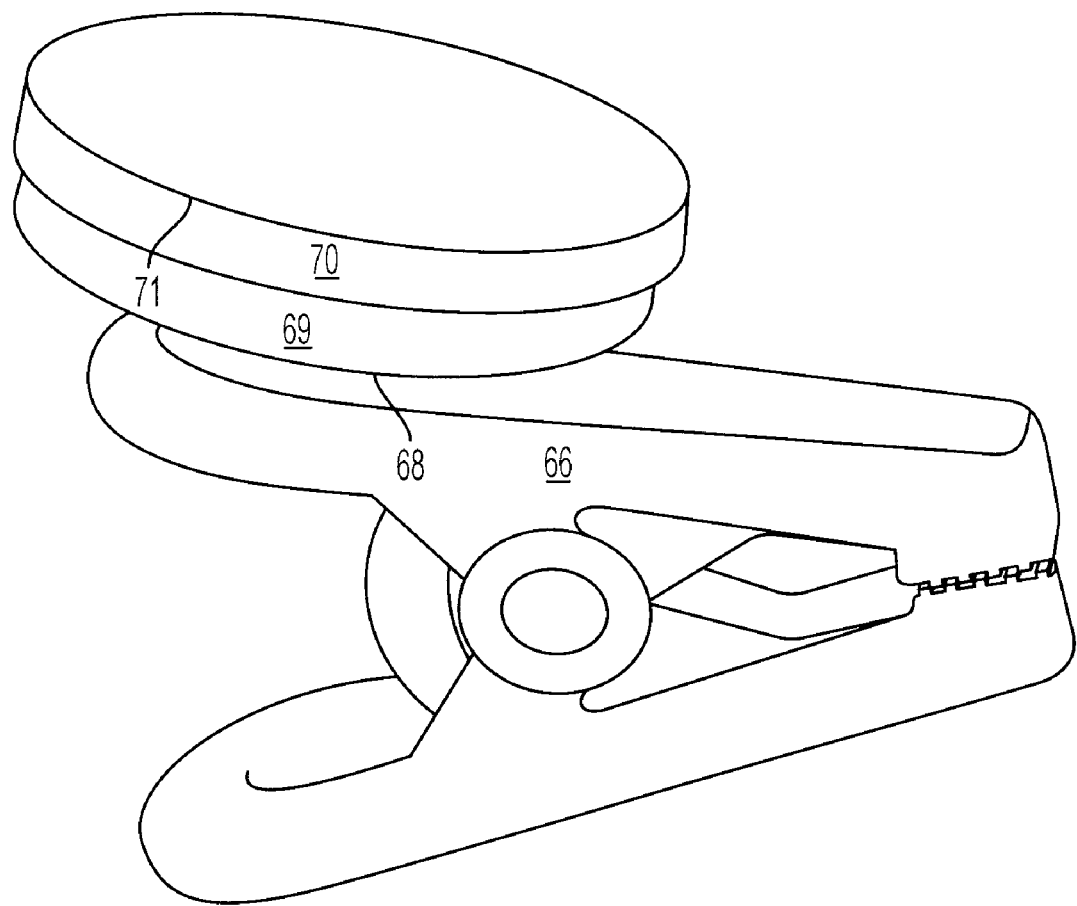
FIG. 21 depicts a perspective view of the first (inner) assembly of the magnetic feeder device of FIGS. 19-20.

FIG. 19 depicts a side view of a magnetic feeder device 60 removably attached to an aquarium wall W according to another embodiment of the invention. The magnetic feeder device 60 may include a first (inner) assembly 62 and a second (outer) assembly 64, the first and second assemblies constructed to be magnetically attracted to one another while disposed on opposite sides of wall W so as to removably couple the device 60 to wall W while holding food for aquatic life contained in the aquarium. The first assembly 62 may include a gripper element 66 having claws 67. Gripper element 66 may be attached to a first element 68 which may be, for example, a standard suction cup. The first element 68 may be attached to a second element 69 which may be formed from closed-cell foam or some other similar material. The second element 69 may be, in turn, attached to another element 70 which may also be formed from some type of closed-cell foam or other similar material. A magnetic or magnetically attractable element (not shown) such as, for example, a neodymium magnet, may be disposed within one or both of the elements 69, 70. Element 70 may contact wall W directly or, alternatively, a layer of adhesively-backed plastic material 71 may be attached to element 70 and configured to contact the wall W. The adhesively-backed plastic material 71 may include product label information or may even include hook and loop fastener material which could be utilized for cleaning the wall W when the feeder 60 is moved by a user U holding the second (outer) member 64. The second (outer) member 64 may be similar in construction to the second (outer) member 20 described above with reference to FIGS. 1 and 5-8. FIG. 20 depicts a side view of a first (inner) assembly 62 of the magnetic feeder device 60 of FIG. 19. FIG. 21 depicts a perspective view of the first (inner) assembly 62 of the magnetic feeder device 60 of FIGS. 19-20.

While various embodiments of the present invention have been described above, it should be understood that they have been presented by way of example only, and not limitation.

The invention claimed is:
1. An aquarium wall cleaning device comprising:
a first flexible member including:
a main body formed entirely from a flexible buoyant material, wherein the main body is configured to conform to a curved surface of the aquarium wall during use;
a first magnetic or magnetically attractable element disposed within a through hole defined in the main body of the first flexible member; and
a first layer attached to the main body of first flexible member and having an abrasive surface, wherein the first flexible member is substantially neutrally buoyant or negatively buoyant in water; and
a second member including:
a main body;
a second magnetic or magnetically attractable element disposed within the main body of the second member, wherein at least one of the first and second magnetic or magnetically attractable elements comprises a magnetic material and the other of the first and second elements is magnetically attracted to the magnetic material; and
a second layer attached to the main body of the second member,
wherein when the first flexible member and the second member are placed on opposite sides of an aquarium wall and the first and second magnetic or magnetically attractable elements are attracted to one another, the first and second layers contact respective inner and outer sides of the wall to allow cleaning of at least one side of the wall.

2. The aquarium wall cleaning device of claim 1, wherein the first layer is adhesively coupled to the main body of the first flexible member and comprises a hook layer of a hook-and-loop fastener.

3. The aquarium wall cleaning device of claim 1, wherein the first flexible member further comprises an additional layer on a surface of the main body opposite the first layer, the first layer and the additional layer sealing the first magnetic or magnetically attractable element within the through hole.

4. The aquarium wall cleaning device of claim 3, wherein the additional layer comprises a plastic label adhesively coupled to the main body of the first flexible member.

5. The aquarium wall cleaning device of claim 1, wherein the second layer is adhesively coupled to the main body of the second member.

6. The aquarium wall cleaning device of claim 5, wherein the second layer comprises a felt material.

7. The aquarium wall cleaning device of claim 1, wherein the second magnetic or magnetically attractable element is disposed within a through hole defined in the main body of the second member, and wherein the second member further comprises an additional layer on a surface of the main body opposite the second layer, the second layer and the additional layer sealing the second magnetic or magnetically attractable element within the through hole.

8. The aquarium wall cleaning device of claim 7, wherein the additional layer comprises a plastic label adhesively coupled to the main body of the second member.

9. The aquarium wall cleaning device of claim 1, wherein the main body of the first flexible member is formed from a buoyant closed-cell foam material or a liquid cast material that is buoyant and flexible when it cures.

10. The aquarium wall cleaning device of claim 9, wherein the main body of the first flexible member is formed from an ethylene vinyl acetate (EVA) polymer.

11. The aquarium wall cleaning device of claim 1, wherein the main body of the second member is formed from a flexible, buoyant closed-cell foam material or a liquid cast material that is buoyant and flexible when it cures.

12. The aquarium wall cleaning device of claim 11, wherein the main body of the second member is formed from an ethylene vinyl acetate (EVA) polymer.

13. The aquarium wall cleaning device of claim 1, wherein the first and second magnetic or magnetically attractable elements include neodymium magnets.

14. The aquarium wall cleaning device of claim 1, wherein the first layer comprises a layer of thin magnetic tape magnetically attracted to the first magnetic or magnetically attractable element, and wherein the abrasive surface includes a hook layer of a hook-and-loop fastener adhesively attached to the layer of thin magnetic tape.

15. The aquarium wall cleaning device of claim 1, further comprising:
    an accessory attachment member magnetically attracted to the first flexible member.

16. The aquarium wall cleaning device of claim 15, wherein the accessory attachment member comprises:
    a main body formed from a flexible, buoyant closed-cell foam material or a liquid cast material that is buoyant and flexible when it cures;
    one or more magnetic or magnetically attractable elements disposed within the main body of the accessory attachment member; and
    one or more layers of adhesively-backed plastic film attached to the main body of the accessory attachment member.

17. The aquarium wall cleaning device of claim 15, further comprising a scraping element removeably secured between the first flexible member and the accessory attachment member and comprising a U-shaped frame defined by a pair of leg extensions configured to contact the aquarium wall.

18. A method for manufacturing an aquarium wall cleaning device comprising:
    providing a first main body formed entirely from a flexible buoyant material, wherein the main body is configured to conform to a curved surface of the aquarium wall during use;
    attaching a first magnetic or magnetically attractable element within a through hole defined in the first main body; and
    attaching a first layer having an abrasive surface to the first main body, wherein the first main body, the first magnetic or magnetically attractable element, and the first layer define a first flexible member that is substantially neutrally buoyant or negatively buoyant in water; and
    providing a second main body;
    attaching a second magnetic or magnetically attractable element within the second main body, wherein at least one of the first and second magnetic or magnetically attractable elements comprises a magnetic material and the other of the first and second elements is magnetically attracted to the magnetic material; and
    attaching a second layer to the second main body, wherein the second main body, the second magnetic or magnetically attractable element, and the second layer define a second member,
    wherein when the first flexible member and the second member are placed on opposite sides of an aquarium wall and the first and second magnetic or magnetically attractable elements are attracted to one another, the first and second layers contact respective inner and outer sides of the wall to allow cleaning of at least one side of the wall.

19. The aquarium wall cleaning device of claim 1, wherein the first magnetic or magnetically attractable element is coated for protection from contact with water.

20. The method for manufacturing an aquarium wall cleaning device of claim 18, further comprising coating the first magnetic or magnetically attractable element for protection from contact with water.

* * * * *